(12) United States Patent
Paik

(10) Patent No.: US 8,200,370 B2
(45) Date of Patent: Jun. 12, 2012

(54) ENERGY REDUCTION

(75) Inventor: Namwook Paik, Acton, MA (US)

(73) Assignee: American Power Conversion Corporation, West Kingston, RI (US)

( * ) Notice: Subject to any disclaimer, the term of this patent is extended or adjusted under 35 U.S.C. 154(b) by 676 days.

(21) Appl. No.: 12/328,714

(22) Filed: Dec. 4, 2008

(65) Prior Publication Data
US 2010/0141046 A1    Jun. 10, 2010

(51) Int. Cl.
*G05D 3/12* (2006.01)
*G01R 21/00* (2006.01)

(52) U.S. Cl. ............ 700/291; 700/12; 700/296; 702/62

(58) Field of Classification Search .................. 700/11, 700/12, 291, 295–297; 705/412; 702/62
See application file for complete search history.

(56) References Cited

U.S. PATENT DOCUMENTS

| | | |
|---|---|---|
| 3,705,280 A | 12/1972 | Harms |
| 4,231,029 A | 10/1980 | Johnston |
| 4,611,289 A | 9/1986 | Coppola |
| 4,674,031 A | 6/1987 | Siska, Jr. |
| 4,763,013 A | 8/1988 | Gvoth, Jr. et al. |
| 4,769,555 A | 9/1988 | Pequet et al. |
| 4,918,562 A | 4/1990 | Pulizzi et al. |
| 5,081,367 A | 1/1992 | Smith et al. |
| 5,270,576 A | 12/1993 | Kahle |
| 5,424,903 A | 6/1995 | Schreiber |
| 5,450,334 A | 9/1995 | Pulizzi et al. |
| 5,462,225 A | 10/1995 | Massara et al. |
| 5,481,140 A | 1/1996 | Maruyama et al. |
| 5,534,734 A | 7/1996 | Pugh et al. |
| 5,646,459 A | 7/1997 | Hatate et al. |
| 5,708,551 A | 1/1998 | Bosatelli |
| 5,721,934 A | 2/1998 | Scheurich |
| 5,758,331 A | 5/1998 | Johnson |
| 5,923,103 A | 7/1999 | Pulizzi et al. |
| 5,939,802 A | 8/1999 | Hornbeck |

(Continued)

FOREIGN PATENT DOCUMENTS

GB    516265    12/1939

OTHER PUBLICATIONS

APC User's Guide Brochure, "InfraStruXure Manager", Mar. 2004, 181 pgs.

(Continued)

*Primary Examiner* — Sean Shechtman
(74) *Attorney, Agent, or Firm* — Gilman Clark & Hunter LLC

(57) ABSTRACT

A power reduction system includes a central server and a plurality of power reduction devices. The central server of the power reduction aggregation system includes: a network interface configured to transmit and receive information to and from a communication network; a power grid status module coupled to the network interface and configured to transmit a power status message to the network, via the network interface, toward at least two power reduction devices connected to the network; and a power savings compensation module configured to determine an aggregate compensation earned for providing an aggregate energy reduction induced by the at least two power reduction devices in response to receiving the power status message, and further configured to determine individual portions of the aggregate compensation associated with each of the at least two power reduction devices.

14 Claims, 8 Drawing Sheets

U.S. PATENT DOCUMENTS

| | | | |
|---|---|---|---|
| 6,011,327 | A | 1/2000 | Cook et al. |
| 6,163,740 | A | 12/2000 | Beltracchi |
| 6,169,979 | B1 | 1/2001 | Johnson |
| 6,172,428 | B1 | 1/2001 | Jordan |
| 6,172,432 | B1 | 1/2001 | Schnackenberg et al. |
| 6,181,028 | B1 | 1/2001 | Kern et al. |
| 6,330,176 | B1 | 12/2001 | Thrap et al. |
| 6,570,269 | B2 | 5/2003 | McMillan et al. |
| 6,630,752 | B2 | 10/2003 | Fleming et al. |
| 6,633,802 | B2 | 10/2003 | Sodoski et al. |
| 6,683,778 | B2 | 1/2004 | Yugou |
| 6,721,672 | B2 | 4/2004 | Spitaels et al. |
| 6,741,442 | B1 | 5/2004 | McNally et al. |
| 6,765,373 | B1 | 7/2004 | Harvey et al. |
| 6,825,578 | B2 | 11/2004 | Perttu |
| 6,832,135 | B2 | 12/2004 | Ying |
| 6,876,103 | B2 | 4/2005 | Radusewicz et al. |
| 6,879,060 | B2 | 4/2005 | Hohri |
| 7,015,599 | B2 | 3/2006 | Gull et al. |
| 7,098,555 | B2 | 8/2006 | Glahn et al. |
| 7,141,891 | B2 | 11/2006 | McNally et al. |
| 7,142,950 | B2 | 11/2006 | Rasmussen et al. |
| 7,282,813 | B2 | 10/2007 | Unger et al. |
| 7,516,106 | B2 | 4/2009 | Ehlers et al. |
| 7,571,063 | B2 * | 8/2009 | Howell et al. .................. 702/60 |
| 7,698,233 | B1 | 4/2010 | Edwards et al. |
| 2002/0130556 | A1 | 9/2002 | Hohri |
| 2002/0134567 | A1 | 9/2002 | Rasmussen et al. |
| 2003/0007369 | A1 | 1/2003 | Gilbreth et al. |
| 2003/0009401 | A1 | 1/2003 | Ellis |
| 2003/0034693 | A1 | 2/2003 | Wareham et al. |
| 2003/0048004 | A1 | 3/2003 | Fleming et al. |
| 2003/0048005 | A1 | 3/2003 | Goldin et al. |
| 2003/0055677 | A1 | 3/2003 | Brown et al. |
| 2003/0062775 | A1 | 4/2003 | Sinha |
| 2003/0072977 | A1 | 4/2003 | Speranza et al. |
| 2003/0111842 | A1 | 6/2003 | Gilbreth et al. |
| 2004/0070894 | A1 | 4/2004 | Beasley, III et al. |
| 2004/0075343 | A1 | 4/2004 | Wareham et al. |
| 2004/0084965 | A1 | 5/2004 | Welches et al. |
| 2004/0169972 | A1 | 9/2004 | Goss |
| 2004/0215529 | A1 | 10/2004 | Foster et al. |
| 2005/0240315 | A1 * | 10/2005 | Booth et al. .................. 700/295 |
| 2006/0007613 | A1 | 1/2006 | Althaus et al. |
| 2006/0072262 | A1 | 4/2006 | Paik et al. |
| 2007/0018506 | A1 | 1/2007 | Paik et al. |
| 2007/0213880 | A1 * | 9/2007 | Ehlers ........................... 700/295 |
| 2007/0271006 | A1 * | 11/2007 | Golden et al. ................. 700/295 |
| 2008/0005044 | A1 | 1/2008 | Benya et al. |
| 2008/0039980 | A1 | 2/2008 | Pollack et al. |
| 2008/0229226 | A1 | 9/2008 | Rowbottom et al. |
| 2008/0284253 | A1 | 11/2008 | Stenfert Kroese et al. |
| 2010/0042453 | A1 | 2/2010 | Scaramellino et al. |
| 2010/0076835 | A1 | 3/2010 | Silverman |

OTHER PUBLICATIONS

Comverge, "Digital Control Unit™ (DCU)", downloaded on Jun. 12, 2008 at http://www.comverge.com/products/dcu.cfm, Product Information Sheet, 1 pg.

Comverge, "SuperStat", downloaded on Jun. 12, 2008 at http://www.comverge.com/products/superstat.cfm, Product Information Sheet, 2 pgs.

Cutler-Hammer, Eaton, "Switchboards Integrated Facility Switchboards", Jan. 2003, vol. 1, Ref. No. (0893), Product Information Sheet, 1 pg.

"Demand Response", downloaded on Jun. 13, 2008 at http://en.wikipedia.org/wiki/Demand_response, p. 1-7.

"Energy Demand Management", downloaded on Jun. 13, 2008 at http://en.wikipedia.org/wiki/Demand_Side_Management, p. 1-3.

MGE UPS Systems Brochure, "Galaxy 3000—Data Center Grade Power Protection for Critical Environments", Dec. 2001, 4 pgs.

MGE UPS Systems Brochure, "Galaxy PW—Next Generation Critical Power Protection System", Jun. 2002, 2 pgs.

International Search Report dated May 28, 2010 from PCT Application No. PCT/2009/060901, 4 pages.

* cited by examiner

ENERGY REDUCTION

CROSS REFERENCE TO RELATED APPLICATIONS

This application is related to U.S. patent application Ser. No. 12/328,703, entitled "ENERGY SAVINGS AGGREGATION," filed on even date herewith, which is incorporated by reference in its entirety for all purposes.

BACKGROUND

In electric power grids, demand response refers to the management of demand from customers in response to supply conditions, for example, having electricity customers reduce their consumption at critical times or in response to market prices. In demand response, customers may cut or reduce loads, called load shedding, in response to a request by a utility or market price conditions. An alternative to load shedding is on-site generation of electricity to supplement the power grid. Under conditions of tight electricity supply, demand response can significantly improve system reliability, reduce the peak price and, in general, reduce electricity price volatility. Since electrical systems are generally sized to correspond to peak demand (plus margin for error and unforeseen events), lowering peak demand reduces overall plant and capital cost requirements. Depending on the configuration of power generation facilities, demand response may also be used to increase demand (load) at times of high production and low demand. As the proportion of intermittent power sources such as wind power in a system grows, demand response may become increasingly important to effective management of the electric grid.

Demand response is generally used to refer to mechanisms used to encourage consumers to reduce demand, thereby reducing the peak demand for electricity. Energy consumers usually need some incentive to respond to a request from a demand response provider. For example, the utility might create a tariff-based incentive by passing along short-term increases in the price of electricity. The utility could impose mandatory cutbacks during a heat wave for selected high-volume users, who are compensated for their participation. High volume energy users may receive a rebate or other incentive based on firm commitments to reduce power during periods of high demand

SUMMARY

An exemplary power reduction system in accordance with the disclosure includes a power reduction system including: an input configured to receive power from a power source; outputs configured to provide output power to loads; switches coupled to the input and the outputs; a network interface configured to receive a power status message from a network; a controller coupled to the switches and the network interface and configured to control the switches to selectively couple/decouple the input to/from the outputs in response to the power status message; and an energy consumption module coupled to the input and configured to determine an energy consumption measure of energy provided by the input to the outputs that are coupled to the input, where the network interface is coupled to the energy consumption module and is further configured to transmit the energy consumption measure toward a remote device connected to the network.

Embodiments of such power reduction systems may include one or more of the following features. The energy consumption measure is a reduced energy consumption measure based on (1) energy provided by the input during a time period during which the controller decouples the input from at least one of the outputs and (2) a baseline energy consumption estimate for the time period. The energy consumption module is configured to determine the baseline energy consumption estimate based on energy provided by the input during a time period during which none of the outputs are decoupled from the input by the controller, and store the baseline energy consumption estimate in memory. The energy consumption module is configured to determine an average baseline consumption estimate for multiple time periods based on the stored baseline energy consumption estimate, where the average baseline consumption estimate time periods comprise at least one of hours, days, weeks, months and years. The received power status message may include information indicating to cancel an action induced by a previously received power status message. The power status message may include information regarding at least one of instructions regarding a type of device to decouple from the input, instructions regarding a specific output to decouple from the input, instructions regarding an amount of energy reduction to induce, or a level of compensation that will be received for a level of energy reduction induced. Systems may include a backup power source, where the controller is further configured to couple the backup power source to at least one of the outputs. The backup power source may include an uninterruptible power supply. The energy consumption measure is a reduced energy consumption measure based on (1) energy provided to the outputs during a time period during which the controller decouples the input from at least one of the outputs and (2) baseline energy consumption estimates for the time period, and where the energy consumption module is further configured to determine baseline energy consumption estimates based on energy provided to each of the outputs. The energy consumption measure comprises a first energy consumption measure based on energy provided by the input while none of the outputs are de-coupled from the input by the controller in response to any power status message and a second energy consumption measure based on energy provided by the input while at least one of the outputs is decoupled from the input by the controller in response to the power status message.

An exemplary method of power reduction includes: receiving power from a power source; providing power received from the power source to outputs coupled to loads; receiving a power status message from a network; controlling switches coupled to the power source and the outputs to selectively couple/decouple the power source to/from the outputs in response to receiving the power status message; determining an energy consumption measure of energy provided by the input to the outputs that are coupled to the input, and transmitting the energy consumption measure toward a remote device connected to the network.

Embodiments of such a method may include one or more of the following features. The energy consumption measure is a reduced energy consumption measure based on (1) energy provided by the power source during a time period during which the power source is selectively decoupled from at least one of the outputs in response to the power status message and (2) a baseline energy consumption estimate for the time period. Controlling at least one of the switches to couple at least one of the outputs to a backup power source. The backup power source may include an uninterruptible power supply. Determining the baseline energy consumption measure based on the energy consumed by the loads during a time period while none of the outputs is controlled to be decoupled from the power source in response to the power status message, and storing the baseline energy consumption measure in memory. The method includes transmitting the reduced energy consumption measure to the network toward a remote device. The method may include controlling at least one of the switches to couple at least one of the outputs to a backup power source. The backup power source is an uninterruptible power supply. The energy consumption measure is a reduced energy consumption measure based on (1) energy provided to the outputs during a time period during which the power source is selectively decoupled from at least one of the outputs and (2) baseline energy consumption estimates for the time period, the method further comprising determining the baseline energy consumption estimates based on energy provided to each of the outputs. The energy consumption measure is a first energy consumption measure based on energy provided by the input while none of the outputs are de-coupled from the input by the controller in response to any power status message and a second energy consumption measure based on energy provided by the input while at least one of the outputs is decoupled from the input by the controller in response to the power status message.

An exemplary embodiment includes a computer readable medium having stored thereon sequences of instruction including instructions that will cause a processor to: receive a power status message from a network; control switches, the switches being coupled to a power source and outputs, where the outputs are coupled to loads, to selectively couple/decouple the power source to/from the output in response to receiving the power status message; determine an energy consumption measure of energy provided by the input to the outputs that are coupled to the input, and cause a transmitter to transmit the energy consumption measure toward a remote device connected to the network.

Embodiments of the disclosure may provide one or more of the following capabilities. Multiple retail electric energy users (from single homeowner to a multi-family residence, or a small office building) may participate in selling saved power back to the utility during shortages. Energy consumption can be reduced voluntarily and/or automatically and with little inconvenience. Energy savings by small individual users can be measured, aggregated, verified, controlled and rewarded. The peak power demand of a power grid may be reduced, e.g., avoiding power failures such as brownouts, blackouts, etc. Further areas of applicability of the present disclosure will become apparent from the detailed description provided hereinafter.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The disclosure provided herein describes, among other things, techniques, embodied in methods and/or apparatus, for controlling power supplied to customers connected to a power grid in order to manage the peak power demand. For example, a central server is provided for aggregating the energy savings of a large number of small electric energy users in such a way to meet the peak power reduction needs of electric utilities, while providing incentives and payments to the small energy users in proportion to the amount of energy saved. The central server transmits power status messages via a communication network to customers connected to a power grid in order to reduce the demand on the power grid. The power status messages contain instructions directing power reduction systems associated with the customers to selectively control power supplied by the power grid to loads connected to the power reduction system.

Power status messages are transmitted to programmable power reduction devices connected to the power grid to selectively control the power supplied to various customer loads. When a power reduction device receives a power status message indicating that power reduction is requested, the power reduction device determines from which loads to cut or reduce power. The programmable power reduction device can be programmed to cut power to different loads based on various priorities. The power reduction device communicates information indicative of the amount of energy reduction or the amount of energy consumed back to the central server for aggregation purposes. Further, the power reduction device can also couple the loads to a backup power supply, such as an uninterruptible power supply. Other embodiments, e.g., of both the central server and the power reduction device, are within the scope of the description and the claims.

Figure 1:
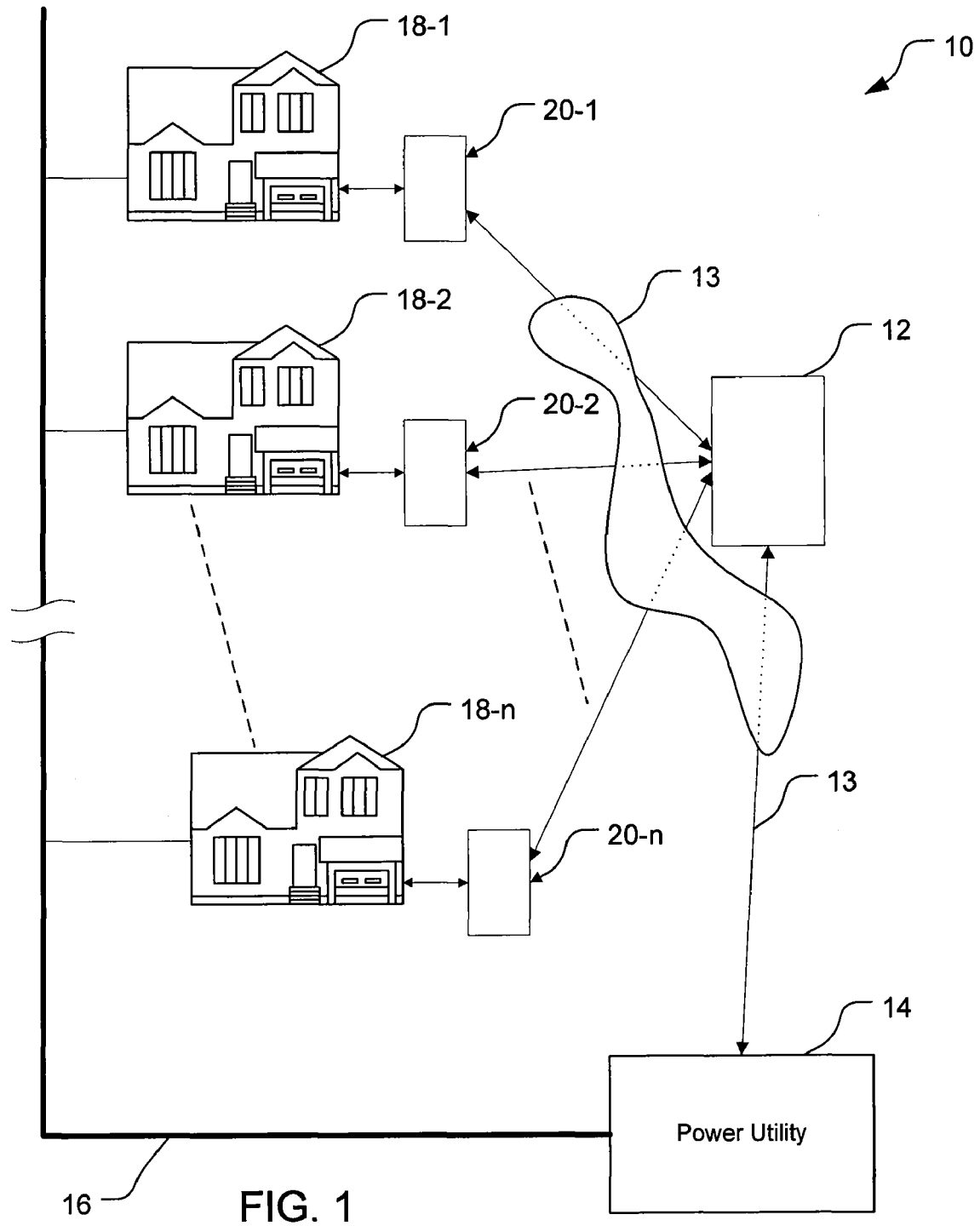
FIG. 1 is a diagram of an embodiment of a power reduction aggregation system for reducing peak power supplied to customers connected to a power grid.

FIG. 1 is a diagram of an embodiment of a power reduction use system 10 for reducing peak power supplied to customers connected to a power grid 16. The system 10 includes a power reduction aggregation system including a central server 12 and multiple power reduction systems 20-1 to 20-n. Multiple customer homes and/or small businesses 18-1 to 18-n each include a respective power reduction system 20-1 to 20-n. The system 10 further includes a power utility 14 that provides power to the power grid 16. The homes 18 are tied to the power grid 16. The power reduction systems 20 are coupled to the power grid 16 and to the loads of the homes 18 with which each power reduction system 20 is associated.

The power reduction systems 20 are communicatively connected to the central server 12 via a network 13. The network 13 can include one or more wired or wireless networks. Wired networks can include telephone networks (e.g., plain old telephone system or POTS), cable networks, computer networks such as LAN, MAN, WAN, power line communications, etc. Wireless networks can include cellular telephone networks, WiFi networks, satellite networks, etc. The network 13 provides for bi-directional communication between the power reduction systems 20 and the central server 12. The central server 12 transmits power status messages to the power reduction systems 20 and receives information regarding energy reduction and/or energy consumption from the power reduction systems 20 via the network 13.

In the system 10, the central server 12 is communicatively connected, here, through the network 13 to the power utility 14 that supplies power to the power grid 16. In other embodiments, the central server could be co-located at the power utility. The central server 12 can receive power status instructions and/or information indicative of the status of the power grid 16 from the power utility 14 via the network 13.

The power utility 14 can contact the central server 12 to request energy reduction (e.g., of a specified and/or pre-arranged amount). For example, the power utility 14 may do so in response to determining that it cannot meet the power demand without interruption or bringing expensive standby capacity online, e.g., during a period of peak power use. The central server 12 then acts to reduce the energy use of participating individual users, by communicating power status messages to power reduction systems 20 associated with the individual users, and adds up the aggregate total energy savings. This aggregate energy savings is communicated to the utility and payment can be made to the operator of the central server 12. In turn, the operator will distribute a portion of this payment to participating individual users, preferably in amounts proportional to the actual energy saved. Changes in the power grid status that may result in power status messages being transmitted can include the power demand level nearing the capacity or a threshold level related to the capacity of the power grid 16. In other cases some of the capacity of the power grid 16 may be temporarily lowered because of a need to divert power to other power grids or other sections of the power grid 16.

Power status messages are used by the central server 12 to affect the way the individual power reduction systems 20 supply power to the various loads coupled to them. The central server 12 can transmit power status messages to individual power reduction systems 20 or to all the power reduction systems 20. The central server 12 can determine the individual power reduction systems that are to receive power status messages based on current usage levels associated with the individual systems 20, and/or based on past usage levels.

Power status messages can include various instructions for controlling the operations of the power reduction systems 20. For example power status messages can include instructions requesting a power reduction, cancelling a previous power reduction, requesting a percentage reduction in power consumption, or requesting an absolute power reduction amount. Further, power status message can include information regarding a level of compensation, e.g., a price rate or savings amount, that is being offered for reduction in power of a certain level. A power status message can include instructions regarding what to decouple. The instructions could include, for example, instructions regarding which loads or at least which type of loads (e.g., air conditioner, heater, television, computer, games, stereo, etc.) to decouple. A power status message can refer to a previous power status message and affect, in various ways, the previous power status message instructions. For example a power status message could contain instructions for cancelling or modifying the previous instructions. The instructions contained in a power status message could be optional and it could be left up to the power controller 27, based on how it is configured, to determine whether power reduction is desired. The instructions could also be mandatory and the power reduction systems would not have the ability to choose whether or not to follow the instructions. Some power status messages could contain requests for energy usage estimates, current and/or past, or energy reduction estimates (e.g., the amount that energy usage was reduced below a baseline level in response to being instructed to reduce power).

Figure 2:
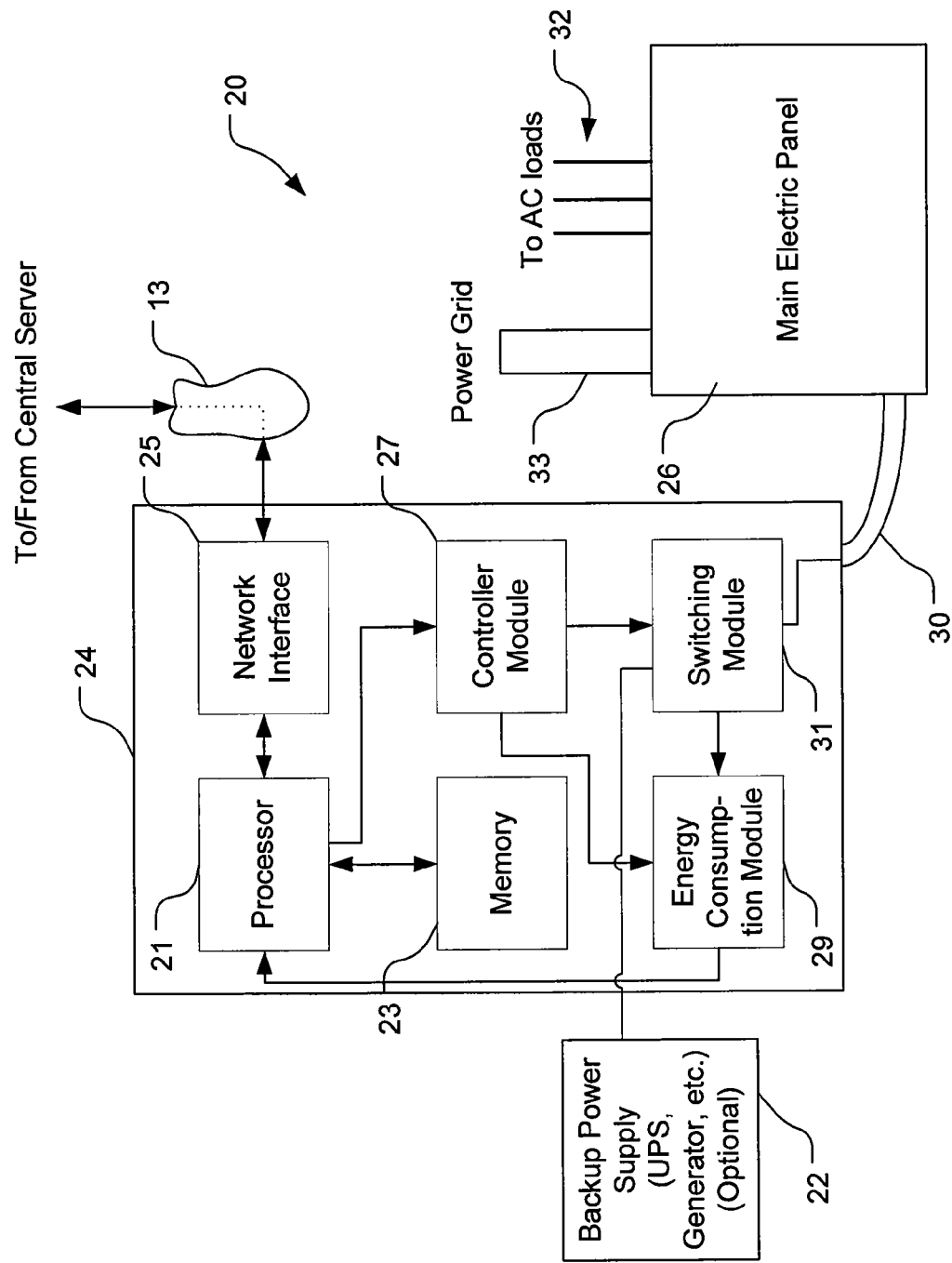
FIG. 2 is a block diagram of an embodiment of a power reduction system for selectively controlling power supplied to loads connected to the power grid of FIG. 1.

Referring to FIG. 2, energy reduction system 20 includes a power reduction controller 24, and a main electric panel 26. The system 20 may be fully or partially within the house 18, or completely external to the house 18. The power reduction controller 24 is connected via a line 30 to an electric panel 26. The line 30 may contain multiple electrical lines and may be contained within a single mechanical conduit. The main electric panel 26 is connected via one or more lines 32 to appropriate AC loads within the house 18 and via appropriate lines 33 to the power grid 16. The power reduction system 20 includes an optional backup power source 22. The optional backup power source 22 could be an uninterruptible power supply (UPS), a generator or other alternative energy source such as solar power or wind power, for example. The optional backup power source 22 is coupled to a switching module 31 of the power reduction controller 24. The module 31 can connect the source 22 to the panel 26 such that the backup power source 22 can supply power to one or more of the AC loads.

The power reduction controller 24 also includes one or more processors 21 coupled to memory 23. The processor 21 can include one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, electronic devices, other electronic units, or a combination thereof.

The processor 21 is configured to store data received by one or more interfaces and process and store the data on the memory 23. The memory 23 can be implemented within the processor 21 or external to the processor 21. The memory may be long term, short term, volatile, nonvolatile, or another type of memory and is not limited to any particular type of memory or number of devices.

The processor 21 is also configured to communicate/receive data and/or instructions to/from a network interface 25, send data/instructions to a controller module 27, and receive data from an energy consumption module 29, and the switching module 31. The network interface 25 is configured to transmit and receive data to/from the network 13.

The switching module 31 contains switches as discussed below with reference to FIG. 3. Outputs of the switches are coupled to loads connected to the electric panel 26. The switches are configured to selectively couple the outputs to an input power source, e.g., the power grid 16 or, if present, the backup power supply 22.

The controller module 27 is coupled to the switching module 31. The controller module 27 is configured to control the switches in the switching module 31 to selectively couple/decouple power to/from the loads. The controller module 27 can decouple selected loads from the power grid line 33 input in response to receiving a power status message. The controller 27 can selectively couple previously decoupled loads to receive power as conditions change (e.g., in response to receiving a power status message cancelling or modifying a previously received power status message). Details of other functions performed by the controller module 27 are discussed below in reference to FIGS. 5 and 7.

The energy consumption module 29 is coupled to the switching module 31 and the controller module 27. The energy consumption module can be coupled to one or more inputs of the switching module 31 and/or one or more of the outputs that are coupled to the loads. The energy consumption module 29 is configured to determine a measure of the energy consumed by the loads. The energy consumption module 29 can determine a measure of the energy consumed separately by each of the loads, e.g., when coupled to the outputs of the switches and/or determine a total energy provided by the input power source(s), e.g., when coupled to the inputs from the power grid. Using information obtained from the controller module 27 about which switches are connected to the power grid and, optionally, which switches are connected to the backup power supply, the energy consumption module 29 can determine which outputs to include in the energy consumption calculations.

The energy consumption module 29 can determine a baseline energy measure and, in response to the power reduction controller 24 receiving a power status message from the central server 12, determine a measure of the reduced energy consumption. The reduced energy consumption measure is the difference between (1) the energy provided to the loads by the input during a time period during which the controller module 27 decouples the input form at least one of the outputs, and (2) the baseline energy consumption measure previously determined. The baseline energy consumption measure is an indicator of an expected energy consumption. The baseline energy consumption measure is preferably based on an historical average of multiple past energy consumption measures for periods of time when no loads are controllably decoupled by the power reduction controller 24.

Preferably, the baseline energy consumption measures are determined for each of the loads independently. In this manner, the baseline energy consumption measures can reflect changes in energy usage for loads which are not correlated to each other. For example, the baseline energy consumption measures of some loads may depend on outside temperatures and/or humidity, e.g., air conditioners and heaters, while others do not. The baseline energy consumption measure for heaters and air conditioners may then be stored as a function of outside temperature and humidity in addition to time of day, week, year, etc.

As an alternative to the energy consumption module 29 calculating the baseline energy consumption measures and the reduced energy consumption measure, the energy consumption module 29 can determine energy consumption measures of energy supplied to the loads in the same way for all time periods and communicate these measures to the processor 21. The processor 21 then communicates these measures over the network 13, via the network interface 25, to the central server 12. In this way, the energy consumption measures determined by the energy consumption module 29 are determined using the same method for all time periods, regardless of whether or not loads are controllably decoupled. The central server 12 periodically transmits a power status message requesting an energy consumption measure to a power reduction system 20. When an energy consumption measure is requested by the central server 12 during a period of normal power grid conditions, a period when power reduction instructions are not in effect, the central server 12 stores the received energy consumption measure as a baseline energy consumption measure. When an energy consumption measure is requested by the central server 12 during a period when power reduction instructions are in effect, the central server uses the received energy consumption measure to determine the reduced energy consumption measure by subtracting the received energy consumption measure from a previously stored baseline consumption measure corresponding to a similar time period (e.g., time of day, day of the week, day of the year, etc.).

Figure 3:
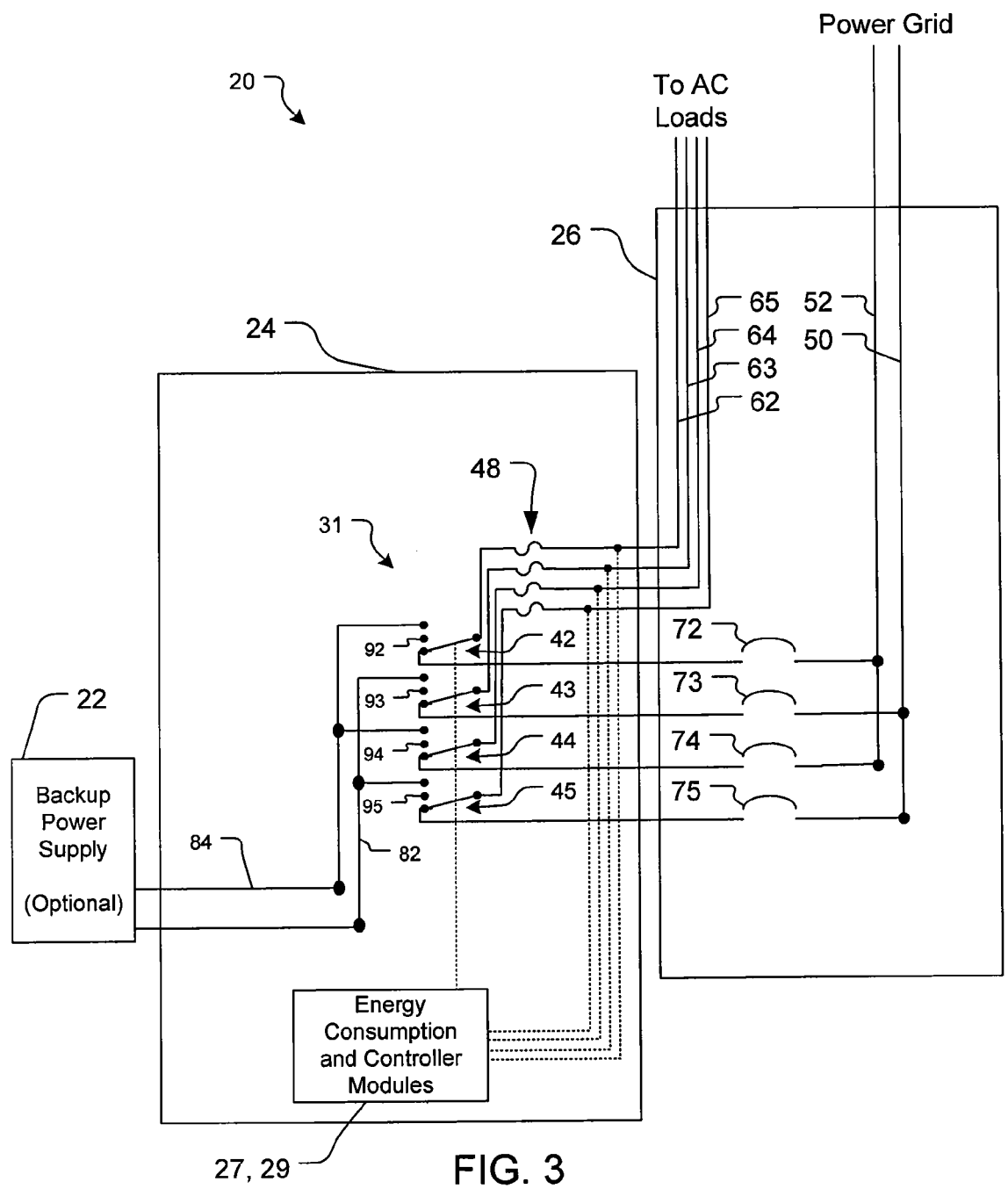
FIG. 3 is a schematic of an embodiment of the power reduction system shown in FIG. 2.

Referring to FIG. 3, the switching module 31 of the power reduction controller 24 comprises load switches 42-45. The electric panel 26 includes lines 50 and 52 connected to the power grid 16, lines 62-65 connected to AC loads, and circuit breakers 72-75. Outputs of the switches 42-45 include fuses 48 and are connected to each of the lines 62-65 connected to AC loads. The controller module 27 and energy consumption module 29 are shown as a single block, but are referred to separately. While only four switches 42-45 and corresponding fuses 48 and load lines 62-65 are shown, other quantities may be used.

Each of the switches 42-45 can be placed in any of three states, connecting its output load line 62-65 to one of the power lines 50, 52, connecting its output load line 62-65 to the optional backup power supply 22 via line 82 or line 84, or connecting its output load line 62-65 to a disconnect position/terminal 92-95 (e.g., an open circuit, not connected to the backup power supply 22 or either of the power lines 50, 52).

The controller module 27 is coupled to the switches 42-45 and selectively couples and decouples the output load lines 62-65, connected to the AC loads, to/from the power grid 16, the open circuit disconnect terminals 92-95, and the backup power supply 22 via lines 82 and 84. The energy consumption module 29 is coupled to the output power lines 62-65 and monitors the power provided to the AC loads. Using switch state information obtained from the controller module 27, the energy consumption module 29 can determine whether the output power is being supplied by the power grid or by the backup power supply 22. Using this information, the energy consumption module can determine whether or not to include the measured output energies in a measure of the total energy being provided by the power grid.

As an alternative to being coupled to the output lines 62-65, the energy consumption module 29 can be coupled to the power lines 50 and 52, or to the input lines of the switches 42-45. The energy measurements determined by the energy consumption module in these cases would be a measure of the energy received from the power grid. Measuring the energy usage at the input lines to the switches 42-45 allows for measurement of the energy usage of each of the loads. Computation of the energy provided by the power grid is simplified in these cases because the computations are not affected by the states of the switches 42-45.

The controller module 27 is configured to selectively couple and decouple certain loads from the switches 42-45 in accordance with one or more methods including, but not limited to, priorities of associated loads, pre-determined or programmable load management settings, and programmable settings as to which loads can be decoupled when they are drawing power (e.g., a user may not want a microwave decoupled when it is drawing power). The controller module 27 can be re-configured by the customer to decouple loads based on several different criteria. The controller module 27 can be configured, for example, to decouple certain types of loads before other types of loads. For example, an air conditioner circuit may be decoupled before a refrigerator circuit is decoupled.

Criteria that can be used by the controller module 27 in determining which loads to couple and/or decouple include: the amount of power being drawn by a load compared to amounts being drawn by other loads, the amount of power being drawn by a load in comparison to the requested power reduction amount (e.g., to decouple the highest drawing loads first in order to decouple the fewest loads to meet the requested amount), a user defined priority of importance or criticality of a load compared to other loads drawing power, and/or to provide minimum on-time duty cycles to the loads.

The controller module 27 could request user input from a user, via a user interface not shown in FIG. 3, to allow the user to determine which loads to decouple. Other criteria can also be used in determining which loads to decouple and/or couple to the power grid 16.

The controller module 27 can be configured to decouple loads based on priorities that depend on the time of day, the day of the week, the time of the year, etc. For example, the controller module 27 for home use is configured not to decouple certain loads during hours when it is expected that people are home and to decouple certain loads during hours when it is expected that people are not home. The controller module 27 is configured to decouple certain loads on weekdays, but not on weekends, and vice-versa. The controller module 27 is also preferably configured to decouple different loads at different times during the year.

The controller module 27 is configured to decouple loads in order to meet a requested power reduction, e.g., a percentage, threshold or an absolute power reduction threshold (e.g., so many kw-hours). The prioritizations discussed above are utilized to choose the order in which the loads are decoupled to try to meet the requested power reduction threshold.

The controller module 27 can be configured to decouple and the recouple loads to the power input such that the loads are run at a reduced duty cycle. For example, a refrigerator circuit could be decoupled for an amount of time and then recoupled for an amount of time. Further, the controller module 27 can control loads not just to be on/off, but to be part-on or part-off. The reduced duty cycle on/off periods or part-on part-off levels can be varied based on various factors, e.g., time of day, temperature (e.g., for an air conditioner or other climate control load), etc. The controller module 27 can also indirectly couple or decouple loads by adjusting control settings, e.g., thermostat settings, lighting levels, etc.

The controller module 27 can be configured to decouple certain loads only if one or more shedding criteria is (are) met, e.g., a threshold amount of savings or payments being offered, e.g., a reduction in cost per kw-hour, or a certain price rate is offered. Preferably, the power status message received from the central server 12 includes a lump sum savings amount or a price rate per kw-hour that is being offered to reduce power consumption by a threshold amount. The savings amount or price rate could depend on a percentage or absolute amount of power reduction that is induced in response to the offer. For example, a power utility may offer a reduction of 10% in rates charged per kw-hour for a power reduction between 1 kw to 5 kw, a reduction of 15% for a power reduction between 5 kw and 10 kw, etc. The controller module 27 is configured to determine which loads to shed and by how much based on prioritizations, shedding criteria, incentives offered/available, how many loads are drawing power, which loads are drawing power (e.g., high priority loads, low priority loads, etc.), the time of day, the day of the week, the season, etc. Again, the prioritization methods discussed above can be utilized in choosing the order in which the loads are decoupled in order to meet the threshold levels.

Figure 4:
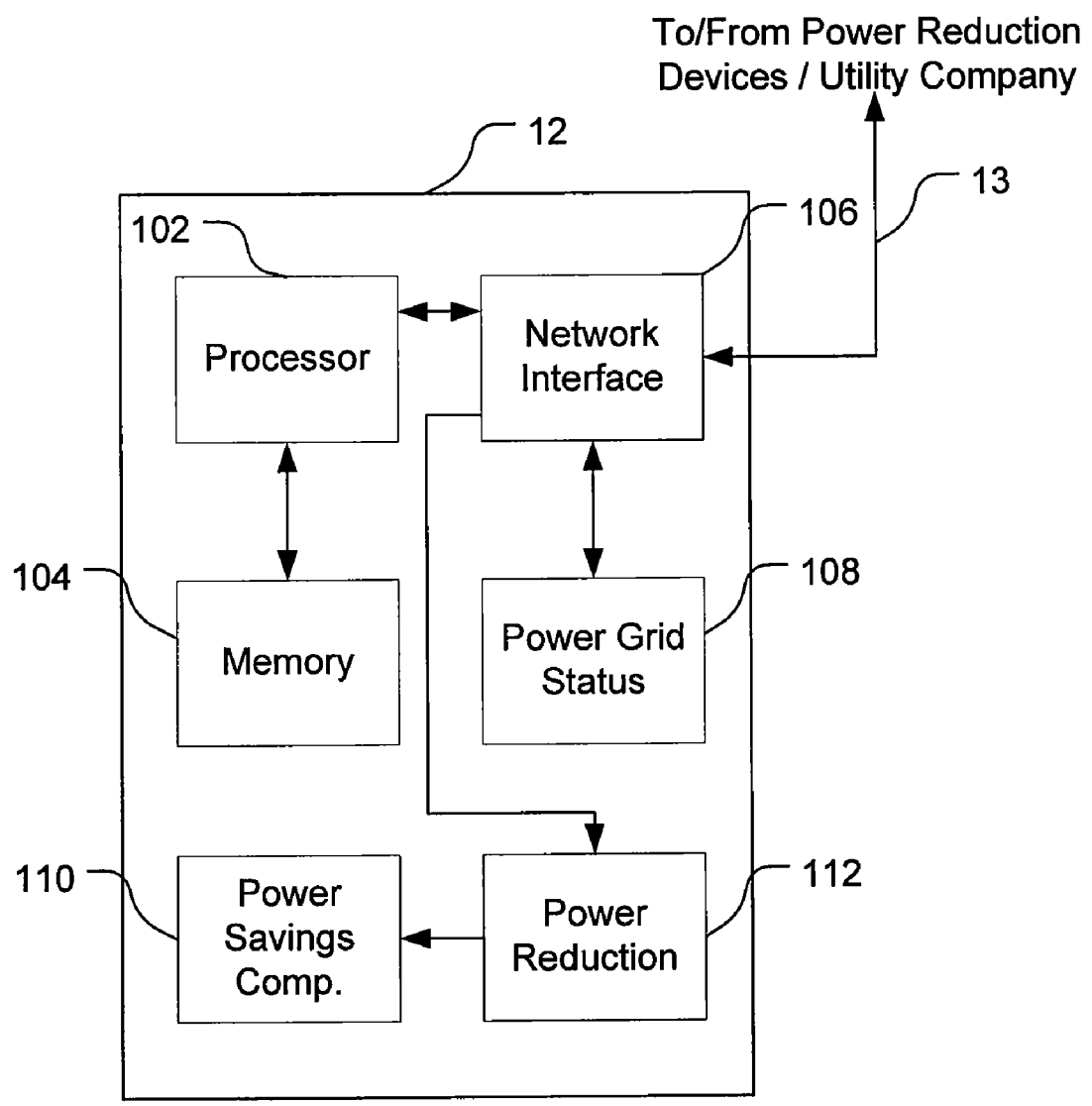
FIG. 4 is a block diagram of an embodiment of a central server of the power reduction aggregation system for reducing peak power shown in FIG. 1.

Referring to FIG. 4, the central server 12 includes a processor 102 coupled to memory 104. The processor 102 can include one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, electronic devices, other electronic units, or a combination thereof.

The processor 102 is configured to process and/or store data received from a network interface 106 on the memory 104. The memory 104 can be implemented within the processor 102 or external to the processor 102. The memory 104 may be long term, short term, volatile, nonvolatile, or another memory and is not limited to any particular type of memory or number of devices.

The processor 102 is also configured to communicate data and/or instructions to and/or from the network interface 106, a power grid status module 108, a power savings computation module 110, and a power reduction module 112.

The network interface 106 is configured to transmit and receive data over the network 13. The network interface 106 can transmit the power status messages to the power reduction systems 20. In addition, the network interface 106 can transmit and receive information to and from the power utility 14. For example, the network interface 106 can receive indications from the power utility 14 that power reductions are to be initiated or can be canceled. Further, the network interface 106 can transmit power reduction estimates toward the power utility 14 over the network 13.

The power grid status module 108 is coupled to the network interface 106 and is configured to transmit power status messages to the network 13, via the network interface 106, toward the power reduction controllers 24. The determination of when to transmit a power status message can be made independently by the power grid status module 108, or the power grid status module 108 can receive direction from an external source, e.g., the power utility 14, via the network interface 106. The power status messages can request a power reduction, request cancelling a previous power reduction, request a percentage reduction in power consumption, or request an absolute power reduction amount. The power status message can include information regarding one or more incentives, e.g., a level(s) of compensation such as price rates or savings amounts, that are being offered for reductions in power of corresponding amounts. The requested amounts can be the same for all the power reduction controllers 24 on the grid, or the requested amounts can be determined based on criteria such as the current energy consumption level, historical baseline energy consumption levels, etc.

Some of the functions of the power controller module 27 discussed above can be included in the power grid status module 108, or another module, of the central server 12. For example, the power grid status module 108 could be configured to transmit a power status message including instructions regarding what to decouple. The instructions could include, for example, instructions regarding which loads or at least which type of loads (e.g., air conditioner, heater, television, computer, games, stereo, etc.) to decouple, instructions regarding an amount (percentage or absolute amount) of power to decouple, etc.

The power savings compensation module 110 is configured to determine an aggregate compensation earned for providing an aggregate energy reduction induced by the power reduction devices in response to receiving the power status messages transmitted by the power grid status module 108. In addition, the power savings compensation module 108 is configured to determine individual portions of the aggregate compensation associated with each of the power reduction devices that received the power status messages. The power savings compensation module 110 receives, from the power reduction module 112, individual power reduction estimates corresponding to the power reduction controllers 24. The individual power reduction estimates are combined by the power reduction module 112, to determine an aggregate power reduction estimate. The power savings compensation module 110 receives the aggregate power reduction estimate from the power reduction module. As discussed above, the individual energy reduction estimates can be determined by the individual energy consumption modules 29 of the individual power reduction controllers 24, or by the power reduction module 112 of the central server 12. In cases where the individual energy reduction estimates are determined by the power reduction controllers 24, the power savings compensation module 110 preferably confirms and/or verifies the energy reduction estimates, e.g., using utility company records, to prevent fraudulent energy reduction claims.

Based on what the power utility agreed to pay for power reduction, the power savings compensation module 110 determines the amount of aggregate compensation earned for the aggregate power reduction estimate. The power savings compensation module 110 can then determine the individual portions of the aggregate compensation associated with each of the power reduction devices. The central server 12 subtracts a portion of the aggregate compensation before determining the individual portions in order to cover expenses and in some cases make a profit. The power savings compensation module 110 can then determine the individual portions of the reduced aggregate compensation proportionally, or some other agreed upon compensation structure, (e.g., after subtracting the expenses and/or profit) based on the ratios of the individual power reduction estimates to the aggregate power reduction estimate.

The individual compensation portions can also be affected by the amount of power reductions that were induced by the individual power reduction devices. For example, a higher price rate could have been offered for higher levels of power reduction, as discussed above. In theses cases, the power savings module 110 can include the various price rates in determining the individual compensation portions. Other methods of determining the individual compensation portions are within scope of the methods describe herein.

The power reduction module 112 is coupled to the network interface 106 and the power savings module 110. The power reduction module 112 is configured to receive indicia, via the network interface 106, of a reduction in energy consumption of loads associated with each of the power reduction devices that induced power reductions in response to a power status message. The power reduction module 112 estimates the aggregate power reduction by adding the individual energy reduction estimates. The individual and aggregate energy reduction estimates are provided to the power savings compensation module 110, e.g., by storing them in the memory 104, in order for the power savings compensation module 110 to perform its functions as discussed above.

The indicia of the reduction in energy received by the power reduction module 112 can be individual estimated energy reductions that were computed by the individual energy consumption modules 29 of the individual power reduction controllers 24. The power reduction module 112 computes the aggregate energy reduction estimate by combining these individual energy reduction estimates.

Instead of the energy reduction indicia being energy reduction estimates computed by the energy consumption modules 29, the indicia of the reduction in energy received by the power reduction module 112 can be periodic energy consumption measures. The power reduction module 112 determines the energy reduction estimate based on the energy consumption measures communicated periodically from the power reduction devices to the central server 12. The power reduction module 112 can use methods similar to those discussed above, e.g., computing baseline energy consumption measures, to calculate the reduction in energy estimates. The power reduction module 112 keeps track of when each power reduction device is in a normal state for calculating the baseline measures, and when each power reduction device is in a reducing state for calculating the energy reduction estimates. More details of determining the power reduction estimates are discussed below in reference to FIGS. 5-8.

Figure 5:
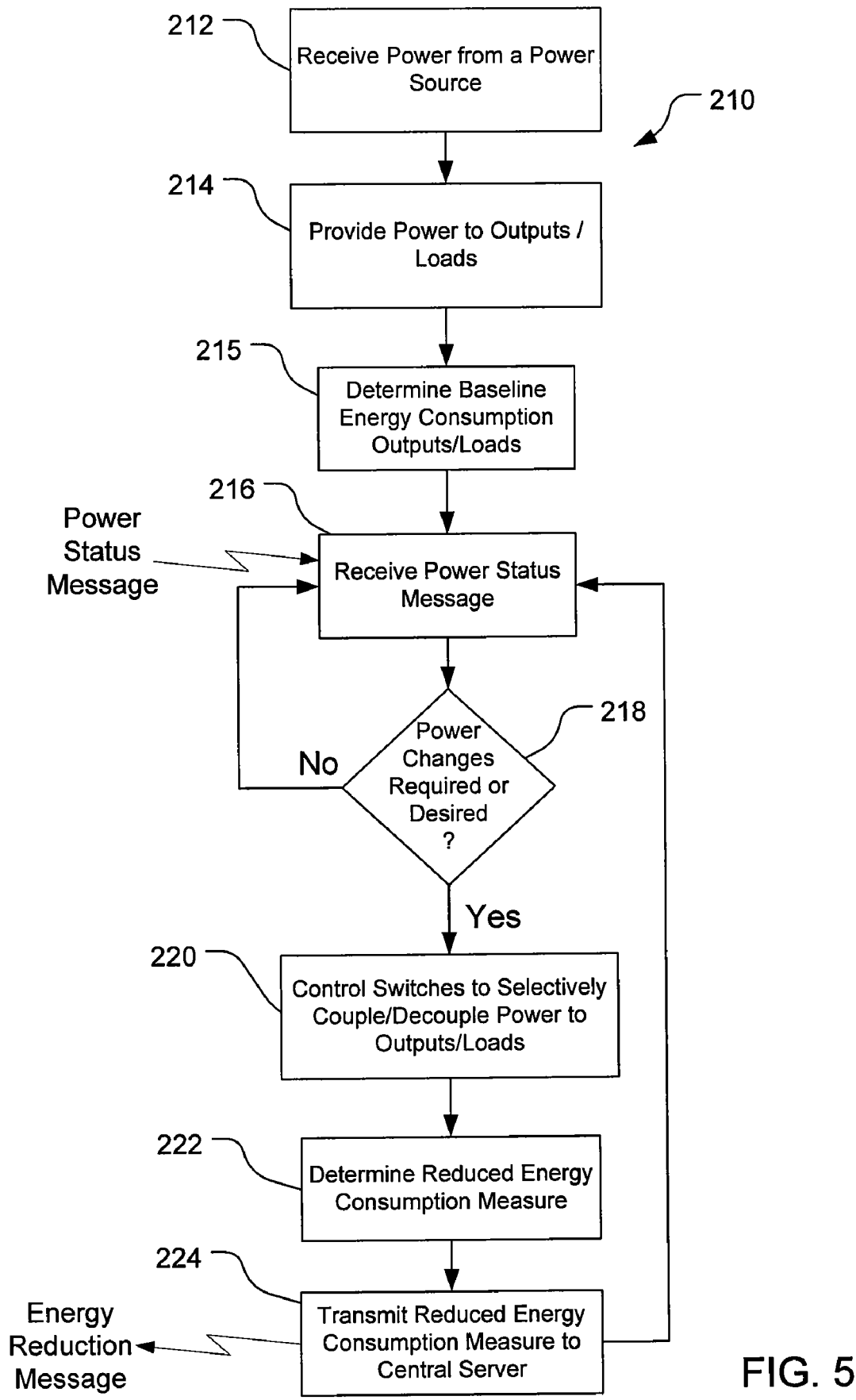
FIG. 5 is a flowchart of an embodiment of a process performed by a power reduction system of FIG. 2.

Referring to FIG. 5 with reference to FIGS. 1-3, a process 210 performed by the power reduction system 20 of FIG. 2 includes the stages shown. The process 210 is performed by the various modules of the power reduction controller 24. In this example, the energy consumption module 29 is configured to determine the reduced energy consumption measures including calculating baseline energy consumption measures. At stage 212, an input of the switching module 31 receives power from a power source, e.g., the power grid 33.

At stage 214, the power received from the power source at stage 212 is provided to outputs of the switching module 31 which are connected to the various loads of the house 18 associated with the power reduction controller 24 performing the process 210. Depending on whether the current state of the power grid 33 is normal or abnormal (e.g., a power reduction state), some or all of the switches 42-45 are in a state that couples the outputs and corresponding loads to the power grid 16.

At stage 215, the energy consumption module 29 determines baseline energy consumption estimates for the outputs/loads. The baseline consumption estimates are determined for each of the output lines 62-65 attached to the AC loads. The baseline energy consumption estimates can be made periodically, e.g., every 15 minutes, every half-hour, every hour (or other periodic or aperiodic intervals), in order to develop a robust baseline usage database for each of the loads. The baseline energy consumption estimates can be stored in memory and cross-referenced to the time of day, week, year. The baseline energy consumption estimates can also be cross-referenced to other parameters, such as, for example, outside temperature and humidity, e.g., for loads including air conditioners, heaters, fans, or other devices affected by the weather.

At stage 216, the network interface 25 receives a power status message via the network 13 from the central server 12. The power status message contains a request/instruction regarding power consumption, to reduce power consumption and/or cancel or modify a previous power reduction request/instruction.

Based on the information contained in the power status message received at the stage 216, the power controller 27 determines, at stage 218, whether or not to change which loads are connected to receive power. The determination made at stage 218 depends on the power reduction request contained in the power status message received at stage 216. The instructions in a power status message can include required actions or optional actions. If the power reduction request is unchanged from a previous message, the power controller 27 determines that no change is necessary. If the power status message contains a new power reduction request, the power controller determines that changes should be made if the requested power reduction criteria is not currently being met. For example, if the power reduction request is for a percentage reduction of the baseline power consumption, the power controller 27 compares a current power reduction measure to the requested reduction level in making the determination. If the power reduction request is for decoupling specific loads, such as air conditioners, televisions, etc., the power controller 27 determines that changes are required if the requested loads are not decoupled.

The determination at stage 218 could utilize priority and shedding criteria or rules, pre-determined or programmable load management settings, and/or programmable settings as to which loads can be decoupled when they are drawing power. Priority criteria could include a hierarchical list of loads in order of importance. If any loads below a threshold level of importance are drawing power, the power controller determines that changes are desired. Shedding criteria considered at stage 218 can include rules as to the time of day, week or year that certain loads can be decoupled, rules regarding minimum reimbursement levels that certain loads will be decoupled, rules regarding the current power consumption level, etc.

If it is determined at stage 218 that coupling and decoupling of loads are not to be enacted, the process 210 continues back to stage 216. If a predetermined amount of time passes with no new power status message received, the process 210 moves from stage 216 to stage 218. In this way, the process 210 determines if conditions have changed such that at stage 218 it is determined to alter the power connection states of one or more of the loads.

If it is determined at stage 218 that power reductions are to be enacted, the process 210 continues to stage 220 where the power controller 27 controls one or more of the switches 42-45 to selectively couple and/or decouple the input power received from the grid 16 to the outputs of the switching module 31. Determining which loads to couple or decouple can include criteria such as the amount of power being drawn by one load compared to amounts being drawn by other loads, the amount of power being drawn by a load in comparison to the requested power reduction amount, a user defined shedding criteria such as a priority of importance or criticality of a load compared to other loads drawing power, and providing a minimum on-time duty cycle to certain loads. The controller module 27 could request user input from a user, via a user interface not shown in FIG. 3, to allow the user to determine which loads to decouple. Other criteria can also be used in determining which loads to decouple and/or couple to the power grid 16.

At stage 222, the energy consumption module 29 determines a reduced energy consumption measure. The reduced energy consumption measure is determined based on (1) the energy provided by the input power source during the time period during which one or more of the switches is controlled to decouple one or more of the outputs from the input power source, and (2) a baseline energy consumption estimate for the same time period.

The energy consumption module 29 determines, at stage 215, the baseline energy consumption estimates based on the energy provided by the input power source during time periods during which none of the outputs are decoupled from the input power by the power controller module 27. The baseline power estimates can be calculated for each of the AC loads connected to the output lines 62-65. The baseline estimates are stored in the memory 23. The baseline energy consumption estimates are determined and stored to memory periodically in order to build a baseline energy consumption database. The baseline energy consumption measures are categorized into time periods including fractions of hours or hours of the day, days of the week, weeks or months of the year, etc. By storing a large time history of baseline energy consumption measures that spans an entire year, the baseline energy measures reflect how energy usage is affected by climate, seasonal activities, personal behavior characteristics of the customers, etc. Past baseline energy consumption measures that are stored in memory can be combined (e.g., averaged, time averaged, weight averaged, etc.) with newly determined baseline measures corresponding to similar time periods. In this way, the baseline energy consumption measures can be closer to a statistical mean.

At stage 224, the network interface 25 transmits the reduced energy consumption measure toward a remote device over the network 13. The remote device is determined by the operator of the power aggregation system 10, and in some embodiments, is the central server 12 from which the power status message originated. The process 210 then loops back to stage 216. Stages 216 to 224 continue to be performed as discussed above.

In an alternative to the process 210 of FIG. 5, stage 218 could be omitted. In this alternative, the power status messages received at stage 216 include specific instructions as to which loads to couple or decouple. For example, a customer could have an agreement with the operator of the central server 12 that enables control of the power reduction controller 24 by the central server 12. At stage 220, the power controller 27 uses the instructions received from the central server in controlling the switches 42-45 to couple and/or decouple the input power received from the grid 16 to the outputs of the switching module 31.

Figure 6:
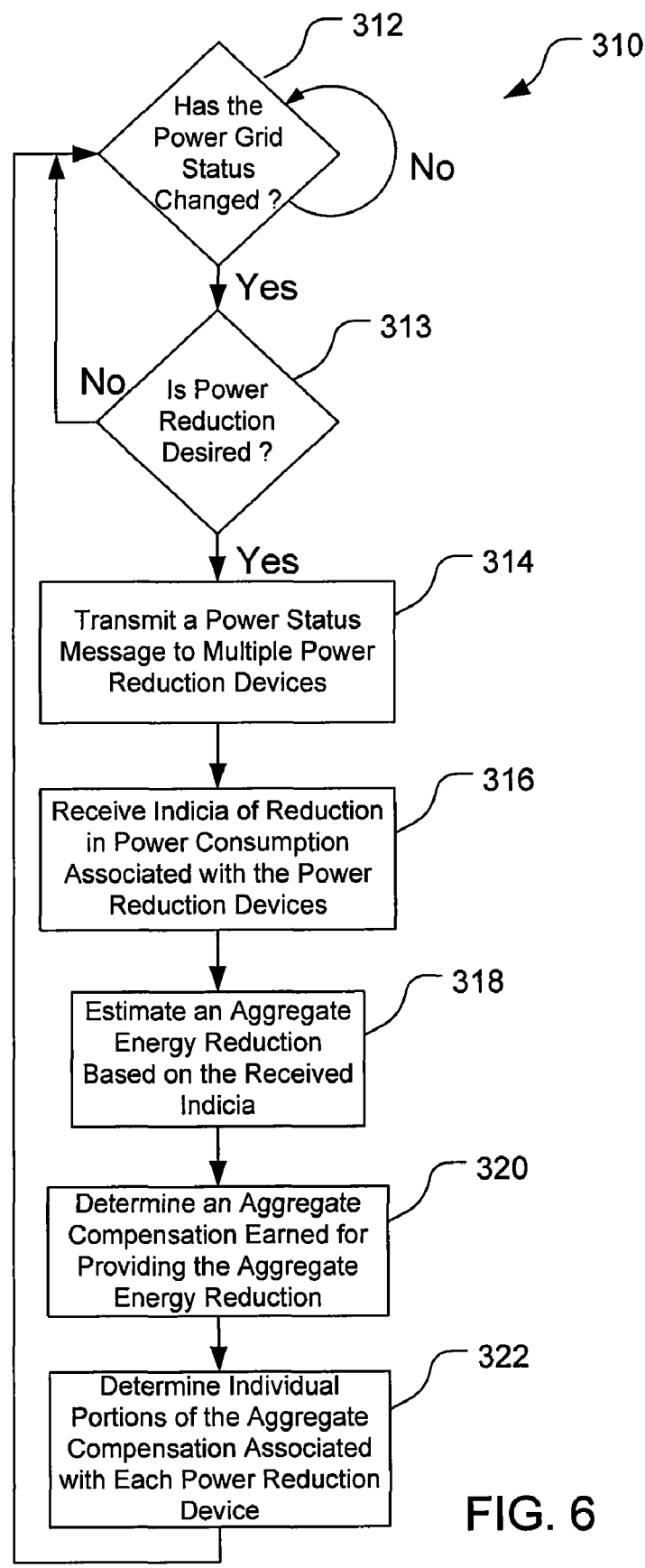
FIG. 6 is a flowchart of an embodiment of a process performed by a central server of FIG. 4.

Referring to FIG. 6, with reference to FIGS. 1-4, a process 310 performed by the central server 12 of FIG. 3 includes the stages shown. The process 310 is utilized by the central server 12 for controlling power reduction controllers 24 that perform the process 210 of FIG. 5. In the process 210, the power reduction controllers 24 determine the reduced energy consumption measures, at the stage 222, and communicate these to the central server 12 at the stage 224.

The process 310 starts at stage 312 where the power grid status module 108 determines if a status of the power grid 16 has change such that a power status message should be sent to any of the power reduction systems 20 connected to the power grid 16. The power grid status module 108 can receive, via the network interface 106 and the network 13, indications of power grid status from the power utility 14. The power grid status module 108 can also be coupled to the equipment of the power grid and be able to determine on its own the status of the power grid.

Changes in the power grid status that may result in a positive determination at the stage 312 include the power demand level nearing the capacity, or the power demand level nearing a threshold level related to the capacity of the power grid 16. The capacity level used at the stage 312 can vary. For example, the capacity level of the power grid 16 could be temporarily lowered because of a need to divert power to other power grids or other sections of the power grid 16.

Other changes that can result in a positive determination at the stage 312 include expected increases in demand such as, for example, expected demand peaks and valleys that consistently occur day to day because of work schedules, for example. The changes that are identified at the stage 312 can result in increases, decreases or cancellation of previous power reduction requests. The power grid status module could also monitor the voltage and frequency characteristics of the grid and use these measurements in determining whether the power grid status is changing.

If, at the stage 312, it is determined that the power grid status has changed and warrants power reduction (or a previous power reduction state could be cancelled or modified in some way), the process 310 continues to stage 313 where the power grid status module 108 determines whether power reduction is desired or warranted due to the power grid status changes. The determination at stage 313 can include determining a cost (e.g., marginal cost or total cost) for acquiring extra power capacity for an anticipated future increase in power. As power grid capacity nears a current capacity limit, additional power generation systems can be brought online. The additional power generation systems can be generators which can be very expensive to operate compared to normal power plants such as coal, natural gas, etc.

Another method of increasing power supply, which can also be expensive, is to purchase power from other power utilities and transfer the purchased power to the power grid. The purchase price can get very expensive due to supply and demand factors. As demand increases, e.g., due to other power grids also demanding more power, the cost increases. If the cost for supplying the anticipated increase is high enough and the expected savings for reducing power exceeds cost incentives offered to the customers to reduce power, then a positive determination at stage 313 could result, and the process 310 proceeds to stage 314. In some embodiments, where a profit is desired, the power savings should be high enough to exceed the cost of the incentives as well as a profit that is desired in order for a positive determination to result at stage 313. If a negative determination is made at stage 312, the process 310 repeats stage 312 until the power grid status changes.

If a positive determination results at stage 313, the process 310 continues to stage 314 where the power grid status module 108 transmits, via the network interface 106, a power status message to a plurality of power reduction devices such as power reduction controllers 24 associated with power reduction systems 20. The power status messages transmitted at the stage 314 can include various instructions for controlling the operations of the power reduction systems 20. For example power status messages can include instructions requesting a power reduction, cancelling a previous power reduction, requesting a percentage reduction in power consumption, or requesting an absolute power reduction amount. Further, power status messages transmitted at the stage 314 can include information regarding a level of compensation, e.g., a price rate or savings amount, that is being offered for reduction in power of a certain levels. A power status message can include instructions regarding what to decouple. The instructions could include, for example, instructions regarding which loads or at least which type of loads (e.g., air conditioner, heater, television, computer, games, stereo, etc.) to decouple. A power status message can refer to a previous power status message and affect, in various ways, the previous power status message instructions. The instructions contained in a power status message could be optional and it could be left up to the power controller 27, based on how it is configured, to determine whether power reduction is desired. The instructions could also be mandatory and the power reduction systems would not have the ability to choose whether or not to follow the instructions. Some power status messages transmitted at the stage 314 could contain requests for energy usage estimates, current and/or past, or energy reduction estimates (e.g., the amount that energy usage was reduced below a baseline level in response to being instructed to reduce power).

At the stage 316, the network interface 106 receives indicia of a reduction in energy consumption of loads associated with each of the multiple power reduction devices to which power status messages were transmitted at the stage 314. The energy reduction indicia received at the stage 316 is a energy reduction estimate determined by the power reduction systems 20 such as discussed above in reference to the process 210 shown in FIG. 5. The energy reduction indicia can be received periodically from the power reduction systems 20 during time periods when the power grid 16 is in a power reduction state. The energy reduction indicia can also be received in response to the central server transmitting a power status message at the stage 314 requesting an energy reduction estimate. The central server 12 requests an energy reduction estimate when the power grid status changes and/or when another power status message is determined to be needed at the stage 312.

The indicia received at the stage 316 are forwarded to the power reduction module 112. At stage 318, the power reduction module 112 estimates the aggregate energy reduction by adding the individual energy reduction indicia that were received at the stage 316. The aggregate energy reduction estimate and the individual energy reduction indicia are stored to the memory 104 for use by the power savings computation module 110 in calculating the aggregate and individual compensations earned by the energy reduction that was induced by the power reduction systems 20 in response to receiving the power reduction requests.

At stage 320, the power savings module 110 determines the aggregate compensation earned for providing the aggregate energy reduction induced in response to the power reduction devices receiving the power status message that was transmitted at the stage 314. Preferably, agreed upon contracts between the operator of the central server 12 (in cases where the power utility 14 running the power grid 16 is not providing the central server 12) and the power utility 14 have been executed such that predefined compensation rates have been defined. The compensation rates can vary as a function of the amount of the power reduction. For example, a higher rate of compensation could be afforded for higher reduction amounts. Alternatively, lower compensation rates could be afforded for higher reduction amounts. The power savings module 110 determines the aggregate compensation amount by multiplying the aggregate energy reduction by the appropriate compensation rate.

At stage 322, the power savings compensation module determines the individual portions of the aggregate compensation that were earned by the individual power reduction devices. The power savings compensation module 110 determines the individual portions of the aggregate compensation associated with each of the power reduction devices to which power status messages were transmitted at the stage 314. The power savings compensation module 110 subtracts a portion of the aggregate compensation before determining the individual portions in order to cover expenses and in some cases make a profit. The power savings compensation module 110 then determines the individual portions of the reduced aggregate compensation proportionally (after subtracting the expenses and/or profit) based on the ratios of the individual energy reduction estimates to the aggregate energy reduction estimate.

Upon determining the aggregate and individual compensations at the stages 320 and 322, the process 310 returns to the stage 312 to determine when to transmit the next power status message when the power grid status changes.

Figure 7:
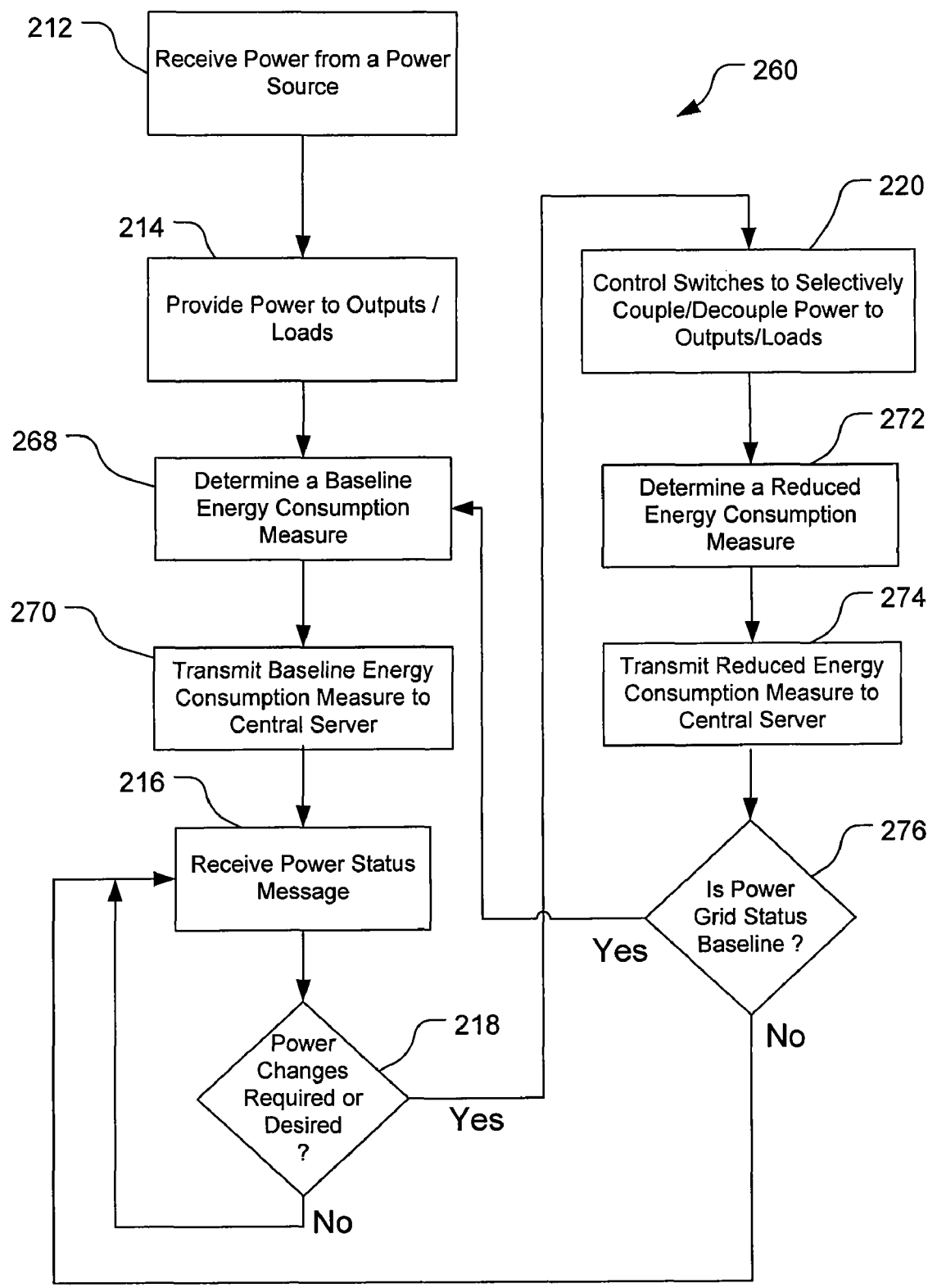
FIG. 7 is a flowchart of another embodiment of a process performed by the power reduction system of FIG. 2.

Referring to FIG. 7, with reference to FIGS. 1-3, a process 260 performed by the power reduction system 20 of FIG. 2 includes the stages shown. The process 260 differs from the process 210 of FIG. 5 in that the energy reduction estimates are not determined by the power reduction device 24, utilizing the energy consumption module 29, but are instead computed by the remote device (e.g., the central server 12) to which baseline and reduced energy consumption measures are transmitted.

Stages 212-214 are unchanged from the same stages in the process 210.

At stage 268 the energy consumption module 29 determines a baseline energy consumption measure or measures. Baseline consumption measures can be determined for each of the AC loads or a single baseline consumption measure can be determined for all the AC loads combined, depending on the embodiment. At stage 270, the network interface 25 transmits the baseline energy consumption measure toward a remote device, e.g., the central server 12, that is connected to the network 13. Stages 268 and 270 can be repeated on a periodic basis during periods when the power grid 16 is in a baseline condition.

Stage 216 is unchanged from the same stage in the process 210. At stage 218, the power controller 27 determines whether or not to change which loads are connected to receive power and how much. Stage 218 is unchanged from the same stage in the process 210 and the same methods discussed above can be performed by the power controller 27.

If it is determined at the stage 218 that coupling and decoupling of loads are not to be enacted, the process 260 continues back to stage 216 to wait for the next power status message to be received. If a predetermined amount of time passes at stage 216 with no new power status message being received, the process 260 continues from stage 216 to stage 218 to again determine if changes are required or desired.

If it is determined at the stage 218 that coupling/decoupling of power to the outputs are to be enacted, the process 260 continues to stage 220 where the power controller 27 controls one or more of the switches 42-45 to selectively couple and/or decouple the input power received from the grid 16 to the outputs of the switching module 31. Stage 220 is unchanged from the same stage in the process 210 and the same methods discussed above can be performed by the power controller 27.

At stage 272, the energy consumption module 29 determines a reduced energy consumption measure based on the energy provided by the input power source to the loads. The same methods that were used to calculate the baseline energy consumption measures at the stage 268 are used to calculate the reduced energy consumption measure at the stage 272. At stage 274, the network interface 25 transmits the reduced energy consumption measure to the remote device, e.g., the central server 12, that is connected to the network 13.

Subsequent to transmitting the reduced energy consumption measure at the stage 274, the process 260 continues to stage 276. At stage 276, the power controller 27 determines if the power grid status has returned to a baseline condition (e.g., the power status message received at stage 216 indicated that previous power reduction actions were to be canceled). If so, the process 260 returns to stage 268 to compute baseline energy consumption. If it is determined at stage 276 that the power grid is not in a baseline condition, the process 260 returns to stage 216 to receive another power status message. When the power reduction system 20 utilizes the process 260, the central server 12 computes the energy reduction measures based on the baseline energy consumption measures transmitted at the stage 270 and based on the reduced energy consumption measures transmitted at the stage 274. Compensations are computed as discussed above in reference to FIG. 6, using historical baseline measures corresponding to similar time frames (e.g., similar time of day, week, month and/or year), where the historical baseline measures were previously transmitted to the central server by the same power reduction system 20.

Figure 8:
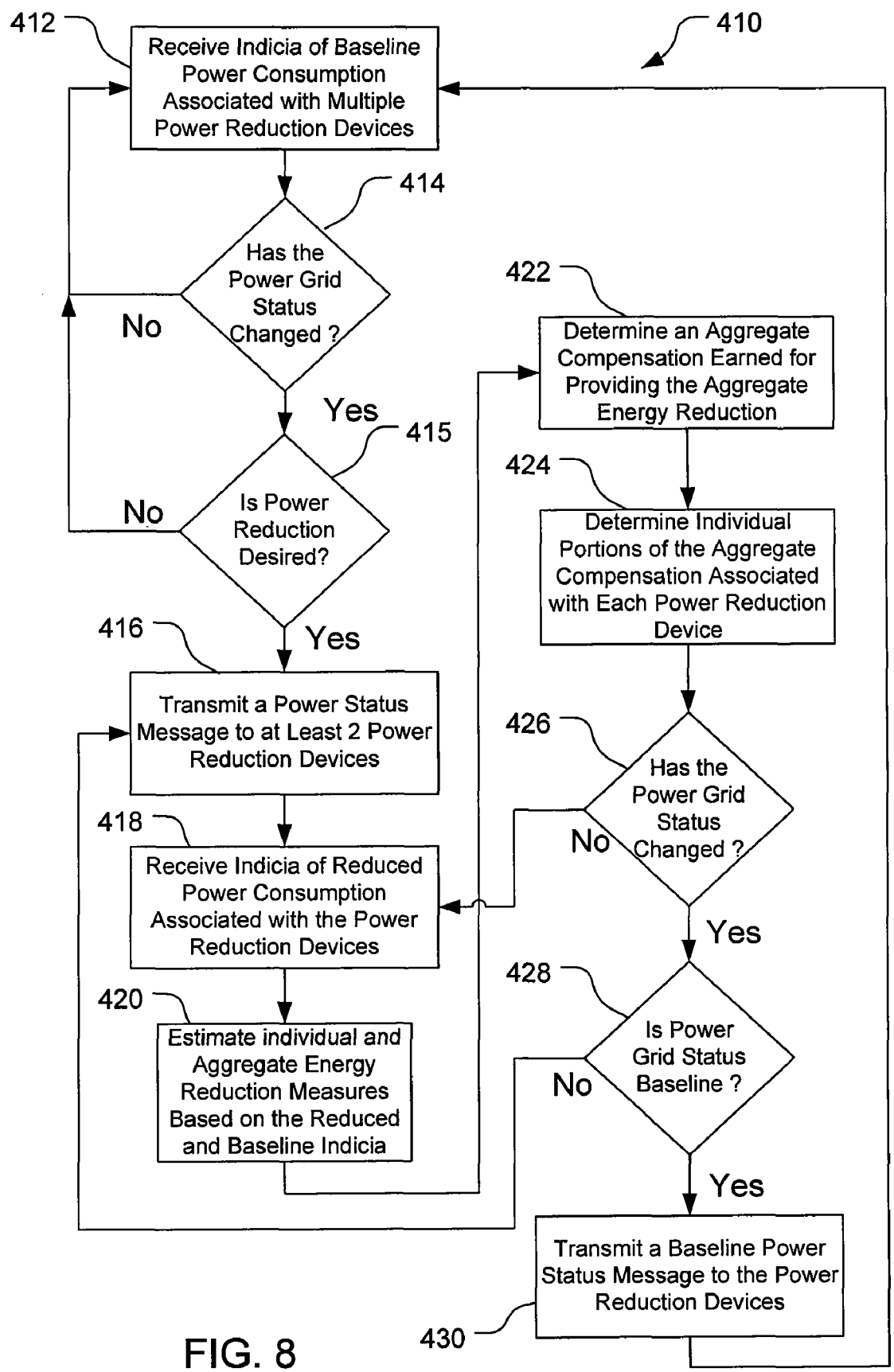
FIG. 8 is a flowchart of another embodiment of a process performed by the central server of FIG. 4.

Referring to FIG. 8 with reference to FIGS. 1-4, a process 410 performed by the central server 12 of FIG. 4 includes the stages shown. In the process 410, the central server 12 receives periodic indicia of energy consumption from the power reduction devices such as was discussed above in reference to FIG. 7. This is in contrast to the process 310 where the central server received indicia of energy reduction estimates that were determined by the individual power reduction systems 20.

At the stage 412, the network interface 106 receives indicia of baseline energy consumption associated with multiple power reduction devices such as power reduction controllers 24. The energy consumption measures received at the stage 412 reflect power usage when none of the loads are controlled to be decoupled from the power grid. The baseline energy consumption estimates are received periodically and stored in the memory 104 in order to build a baseline energy consumption database. The baseline energy consumptions are categorized into time periods including fractions of hours or hours of the day, days of the week, weeks or months of the year, etc. By storing a large time history of baseline energy consumptions that span an entire year, the baseline energy usages can reflect how energy consumption measures is affected by climate, seasonal activities, personal behavior characteristics, etc.

Past baseline energy consumption measures that are stored in memory can be combined (e.g., by averaging, weighted averaging, time averaging, etc.) with newly received baseline measures corresponding to similar time periods. In this way, the baseline energy reduction measures can be closer to a statistical mean.

At stage 414, the power grid status module 108 determines if the status of the power grid 16 has changed from the baseline state. The same methods discussed above in reference to the stage 312 of the process 310 can be used at the stage 414. If the power grid status has not changed, the process 410 returns to the stage 412. If it is determined at the stage 414 that the power grid status has changed, e.g., power consumption nearing capacity, power outages reducing system capacity, etc., the process 410 continues to stage 415. At stage 415, the power grid status module determines if the changed power grid status warrants action in the form of requesting power reductions. The same methods discussed above in reference to stage 313 can be used at the stage 415. If a negative determination results at stage 415, the process 410 returns to stage 412. If a positive determination is made at stage 415, the process 410 continues to stage 416.

At stage 416, the power grid status module 108 transmits, via the network interface 106, a power status message to at least two of the power reduction devices. The power status message includes information regarding the amount of power to reduce (percentages and/or absolute amounts), types of devices to decouple, price rates and/or discounts that can be earned based on the amount of energy reduction, or any of the information as discussed above in reference to power status messages.

At the stage 418, the network interface 106 receives indicia of reduced energy consumption associated with each of the multiple power reduction devices to which power status messages were transmitted at the stage 416. The reduced energy consumption indicia received at the stage 418 are determined by the power reduction systems 20 in the same way as the baseline energy consumption indicia, but the reduced energy consumption indicia will reflect reduced power usage since the power reduction systems 20 are configured to decouple loads in response to the power status message. The energy consumption indicia are received periodically from the power reduction systems 20 or in response to the central server transmitting a message requesting a power reduction estimate.

At stage 420, the power reduction module 112 estimates individual energy reduction measures associated with the power reduction devices based on (1) the reduced energy consumption indicia received at the stage 418 and (2) the historical baseline energy consumption measures received at the stage 412 and stored in the memory 104. The power reduction module 112 then determines an aggregate energy reduction estimate by adding the individual energy reduction indicia that were received at the stage 418. The aggregate energy reduction estimate and the individual energy reduction indicia are stored to the memory 104 for use by the power savings computation module 110 in calculating the aggregate and individual compensations earned by the energy reduction.

At stages 422 and 424, the power savings compensation module 110 determines the aggregate and individual compensations earned for providing the energy reduction in response to the power status messages. The power compensation module 110 uses similar methods at the stages 422 and 424 as discussed above in reference to the stages 320 and 322 of the process 310.

At stage 426, the power grid status module 108 determines if the status of the power grid 16 has changed such that a new power status message is warranted. If it is determined that the power grid status has not changed, the process 410 returns to the stage 418 to receive additional reduced energy consumption measures and proceed through stages 420-426 as discussed above.

If it is determined, at the stage 426, that the power grid status has changed, the process 410 continues to stage 428. At stage 428, if the new power grid status is determined to be a baseline condition, the process 410 proceeds to stage 430. At stage 430, the power grid status module 108 transmits a baseline power grid status message to all the power reduction devices that had been transmitted the non-baseline power status message at the stage 416. The process 410 then returns to the stage 412 to resume receiving baseline energy consumption indicia.

If the new power status is determined, at the stage 428, not to be a baseline condition, the process 410 returns to the stage 416 where a new power status message containing new power reduction instructions is transmitted to power reduction systems 20. The new power status message instructions will depend on how the power grid status changed. If the status is a more severe condition, additional power reduction devices can be requested to reduce power, or larger reductions in power can be requested. If the status is a less severe condition, some power reduction devices can be instructed to cancel the power reduction actions, or smaller reductions in power can be requested. Other types of instructions, such as discussed above, can be included in the new power status message transmitted at the stage 416. The process 410 proceeds through the remaining stages as discussed above.

It should be noted that the stages of the processes 210, 260, 310 and 410 can be combined, rearranged, combined and, in some instances omitted. These processes are examples and other processes are within the scope of the description and claims.

Further, more than one invention may be described herein. What is claimed is:

1. A power reduction system comprising:
an input configured to receive power from a power source;
a plurality of outputs configured to provide output power to a plurality of loads;
a plurality of switches coupled to the input and the plurality of outputs;
a network interface configured to receive a power status message from a network;
a controller coupled to the switches and the network interface and configured to control the switches to selectively couple/decouple the input to/from the outputs in response to the power status message; and
an energy consumption module coupled to the input and configured to determine a reduced energy consumption measure based on the difference between (1) energy provided by the input to the outputs that are coupled to the input during a time period during which the controller decouples the input from at least one of the outputs and (2) a baseline energy consumption estimate for the time period, wherein the network interface is coupled to the energy consumption module and is further configured to transmit the reduced energy consumption measure toward a remote device connected to the network.

2. The system of claim 1, wherein the energy consumption module is further configured to determine the baseline energy consumption estimate based on energy provided by the input during a time period during which none of the outputs are decoupled from the input by the controller, and store the baseline energy consumption estimate in memory.

3. The system of claim 2, wherein the energy consumption module is further configured to determine an average baseline consumption estimate for a plurality of time periods based on the stored baseline energy consumption estimate, wherein the average baseline consumption estimate time periods comprise at least one of hours, days, weeks, months and years.

4. The system of claim 1, wherein the received power status message comprises information indicating to cancel an action induced by a previously received power status message.

5. The system of claim 1, wherein the power status message comprises information regarding at least one of instructions regarding a type of device to decouple from the input, instructions regarding a specific output to decouple from the input, instructions regarding an amount of energy reduction to induce, or a level of compensation that will be received for a level of energy reduction induced.

6. The system of claim 1, further comprising a backup power source, wherein the controller is further configured to couple the backup power source to at least one of the outputs.

7. The system of claim 6, wherein the backup power source comprises an uninterruptible power supply.

8. A power reduction system comprising:
an input configured to receive power from a power source;
a plurality of outputs configured to provide output power to a plurality of loads;
a plurality of switches coupled to the input and the plurality of outputs;
a network interface configured to receive a power status message from a network;
a controller coupled to the switches and the network interface and configured to control the switches to selectively couple/decouple the input to/from the outputs in response to the power status message; and
an energy consumption module coupled to the input and configured to determine a reduced energy consumption measure based on the difference between (1) energy provided to the plurality of outputs during a time period during which the controller decouples the input from at least one of the outputs and (2) a plurality of baseline energy consumption estimates for the time period, and further wherein the energy consumption module is further configured to determine the plurality of baseline energy consumption estimates based on energy provided to each of the plurality of outputs,
wherein the network interface is coupled to the energy consumption module and is further configured to transmit the reduced energy consumption measure toward a remote device connected to the network.

9. A method of power reduction comprising:
receiving power from a power source;
providing power received from the power source to a plurality of outputs coupled to a plurality of loads;
receiving a power status message from a network;

controlling switches coupled to the power source and the outputs to selectively couple/decouple the power source to/from the outputs in response to receiving the power status message;

determining a reduced energy consumption measure based on the difference between (1) energy provided by the power source during a time period during which the power source is selectively decoupled from at least one of the outputs in response to the power status message and (2) a baseline energy consumption estimate for the time period; and transmitting the reduced energy consumption measure toward a remote device connected to the network.

10. The method of claim 9, further comprising:

determining the baseline energy consumption measure based on the energy consumed by the loads during a time period while none of the outputs is controlled to be decoupled from the power source in response to the power status message; and storing the baseline energy consumption measure in memory.

11. The method of claim 9, further comprising controlling at least one of the switches to couple at least one of the outputs to a backup power source.

12. The method of claim 11, wherein the backup power source comprises an uninterruptible power supply.

13. A method of power reduction comprising:

receiving power from a power source;

providing power received from the power source to a plurality of outputs coupled to a plurality of loads;

receiving a power status message from a network;

controlling switches coupled to the power source and the outputs to selectively couple/decouple the power source to/from the outputs in response to receiving the power status message;

determining a reduced energy consumption measure based on the difference between (1) energy provided to the plurality of outputs during a time period during which the power source is selectively decoupled from at least one of the outputs and (2) a plurality of baseline energy consumption estimates for the time period, the method further comprising determining the plurality of baseline energy consumption estimates based on energy provided to each of the plurality of outputs; and transmitting the reduced energy consumption measure toward a remote device connected to the network.

14. A computer readable medium having stored thereon sequences of instruction including instructions that will cause a processor to:

receive a power status message from a network;

control switches, the switches being coupled to a power source and a plurality of outputs, wherein the outputs are coupled to a plurality of loads, to selectively couple/decouple the power source to/from the outputs in response to receiving the power status message;

determine a reduced energy consumption measure based on the difference between (1) energy provided by the input to the outputs that are coupled to the input during a time period during which the controller decouples the input from at least one of the outputs and (2) a baseline energy consumption estimate for the time period; and determine a reduced energy consumption measure based on the difference between (1) energy provided by the input to the outputs that are coupled to the input during a time period during which the power source is selectively decoupled from at least one of the outputs in response to the power status message and (2) a baseline energy consumption estimate for the time period; and determine a reduced energy consumption measure based on the difference between (1) energy provided to the plurality of outputs during a time period during which the controller decouples the input from at least one of the outputs and (2) a plurality of baseline energy consumption estimates for the time period; and cause a transmitter to transmit the reduced energy consumption measure toward a remote device connected to the network.

* * * * *